Sept. 6, 1938.  C. L. HOWSE ET AL  2,129,215
FLUID TREATING APPARATUS
Filed Dec. 11, 1935  2 Sheets-Sheet 1

INVENTOR
CURTIS L. HOWSE
HARRY E. BRELSFORD
BY
ATTORNEY

Sept. 6, 1938.                C. L. HOWSE ET AL                 2,129,215
                         FLUID TREATING APPARATUS
                    Filed Dec. 11, 1935          2 Sheets-Sheet 2

INVENTOR
CURTIS L. HOWSE
HARRY E. BRELSFORD
BY
ATTORNEY

Patented Sept. 6, 1938

2,129,215

UNITED STATES PATENT OFFICE 2,129,215

FLUID TREATING APPARATUS

Curtis L. Howse and Harry E. Brelsford, Birmingham, Mich., assignors to Diamond Power Specialty Corporation, Detroit, Mich., a corporation of Michigan Application December 11, 1935, Serial No. 53,978

10 Claims. (Cl. 261—90)

This invention relates to an apparatus adapted to effect intimate contact of a fluid to be treated with one or a plurality of treating fluids.

One of the primary objects of this invention is to provide an apparatus of the above mentioned character which will include means for causing the treating fluid to contact the fluid being treated with considerable force whereby the desired action of the treating fluid on the fluid to be treated may be obtained.

While in its broader aspects the invention contemplates an apparatus by which one or more treating fluids may be mixed with a fluid to be treated, the invention will find particular utility in a dedusting apparatus in which a dust collecting liquid is caused to contact a gas to remove the dust particles from the gas.

Thus the invention contemplates and has as a further object the provision of an apparatus in which a dust collecting liquid may be propelled with such force and in such a manner against a dust laden gas that the liquid drops will suddenly destroy the gaseous surface tension of the dry solids in the gas thus effecting an efficient removal of the dust particles from the gas.

Numerous other objects and advantages of the invention will become more apparent as the following description proceeds particularly when reference is had to the accompanying drawings wherein Fig. 1 is a longitudinal sectional view through a fluid treating apparatus constructed in accordance with the teachings of this invention;

It has been found that by utilizing a proper form of liquid spray and by propelling this liquid spray with substantial force through the gas being treated, an efficient cleansing of the gas may be obtained. The liquid should be retained in the spray in the form of drops rather than in the form of a mist or fog and these drops should be of sufficient size and be propelled with sufficient force to severely sting the hands at a distance of from two feet to four feet from the nozzles by which the spray is discharged. When a spray of this form is propelled against the gas, the dust particles will be effectively removed from the gas and the relative velocities between the gas being treated and the liquid spray may be proportioned so as to obtain the degree of cleansing action desired.

Generally the invention contemplates discharging a liquid at a high pressure from a nozzle and mingling air or gas with this liquid before it is discharged from the nozzle. This results in the formation of relatively large drops of the liquid which leave the nozzle at a relatively high velocity.

Figure 3:
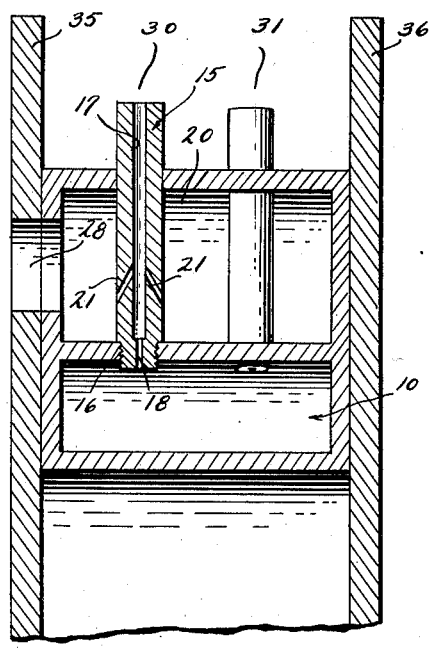
Fig. 3 is an enlarged fragmentary sectional view of the element shown in Fig. 2.

The general principles of the invention will best be understood by first referring to Fig. 3 wherein reference character 10 designates a liquid chamber which by means of a supply pipe 11 may be supplied with a suitable liquid under pressure. The numeral 15 designates generally a nozzle which may be threaded as at 16 into one wall of the chamber 10. The nozzle body is provided with an enlarged longitudinally extending discharge bore 17 which communicates with the chamber 10 by means of a bore 18 of reduced cross sectional area.

The numeral 20 designates a second chamber through which the nozzle body passes and this chamber may be supplied with air or gas under pressure or may be in communication with the atmosphere. The nozzle body is provided with passages 21 which place the bore 17 in communication with the chamber 20, the passages 21 preferably being disposed at an angle to the axis of the nozzle body as illustrated in Fig. 3.

The liquid in chamber 10 by virtue of the fact that it is under pressure, will be forced through the bores 18 and 17 and discharged from the nozzle. In its passage through the nozzle, the liquid will entrain the air or gas from chamber 20 if this air or gas be under atmospheric pressure or the air or gas will be forced into the bore 17 to mingle with the liquid therein, in the event that the air or gas is supplied to chamber 20 under pressure. Because of the elastic nature of the fluid supplied to the bore 17, by way of passages 21, this fluid will be compressed while in the bore 17 and will then expand when discharged from the nozzle and assist in properly breaking up the spray of liquid.

While it is not intended to be limited to any definite nozzle sizes or pressures, one example of a construction which has proven efficient in operation will be given by way of illustration. In this construction, the bore 18 was .0468" in diameter while the bore 17 was .081" in diameter. The overall length of the nozzle was $3\frac{3}{16}$", while the passages 21 were .081" in diameter and disposed at an angle of about 30° with the axis of the nozzle body. With a liquid pressure in chamber 10 of between 450# to 500#, the nozzle discharged approximately 5# of water per minute and produced a jet with an effective spread of 2" from a space 6" from the jet to about 4' from the jet. Throughout this entire distance this jet was filled uniformly with minute drops of liquid of such size and moving at such velocity that they produced a very severe stinging sensation on the palm of the hand when held in the jet. A spray of this character operates efficiently in removing the dust particles from the gas being treated.

It will be apparent that the structure as thus far described may be associated in a number of different ways with a gas duct so that the discharged spray will properly contact the gas being treated. By way of illustration, there is disclosed in Fig. 1, a casing 25 in which the discharge nozzles and their associated chambers may be conveniently located. The casing is provided with an inlet 26 which may be connected to any suitable source of dust laden gas and is provided with an outlet 27 for discharging the cleaned gas to any desired point. The arrows indicate generally the path of travel of the dust laden gas through the casing.

In installing the structure shown in Fig. 3 in the casing 25, the chamber 10 is formed substantially annular in shape and is connected to the supply pipe 11 by axially arranged branch pipes 12. The supply pipe 11 extends out through the casing, being connected to a suitable source of liquid supply (not shown). The chamber 20 which is the air or gas chamber is formed as an annular chamber surrounding the chamber 10 and for supplying gas to this chamber, the same may be placed in communication with the interior of the casing 25 by suitable openings 28. With this construction, it will be apparent that the chamber 20 will be supplied with the gas which is flowing through the gas duct or casing 25.

Figure 2:
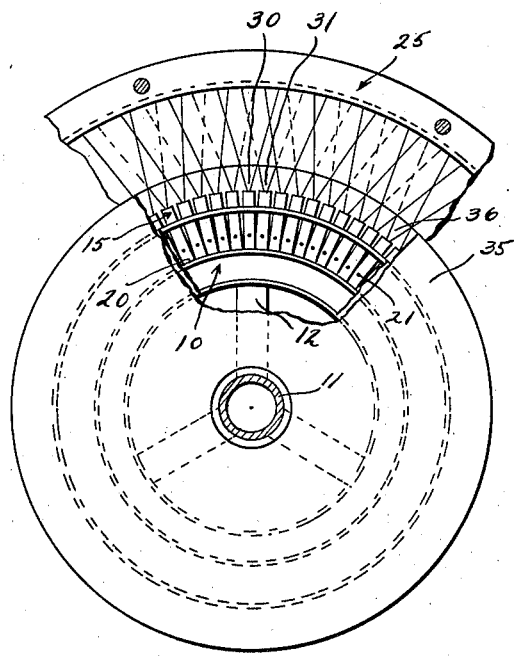
Fig. 2 is a detail side elevational view of a portion of the structure shown in Fig. 1.

Referring now to Figs. 2 and 3, it will be noted that the nozzles 15 extend radially from the chamber 10, these nozzles being arranged in a row designated by the reference character 30, the row extending circumferentially around the chamber 10. To obtain more effective coverage of the space through which the gases flow, there is preferably provided a second row of nozzles 15, this row being designated by the reference character 31 and the nozzles in this row being staggered relative to the nozzles in the row 30. It will be noted by reference to Fig. 3 that the two rows of nozzles are spaced sufficiently apart axially of the chamber 10 to provide for the ready insertion and removal of the nozzles without interference one with the other.

Figure 1:
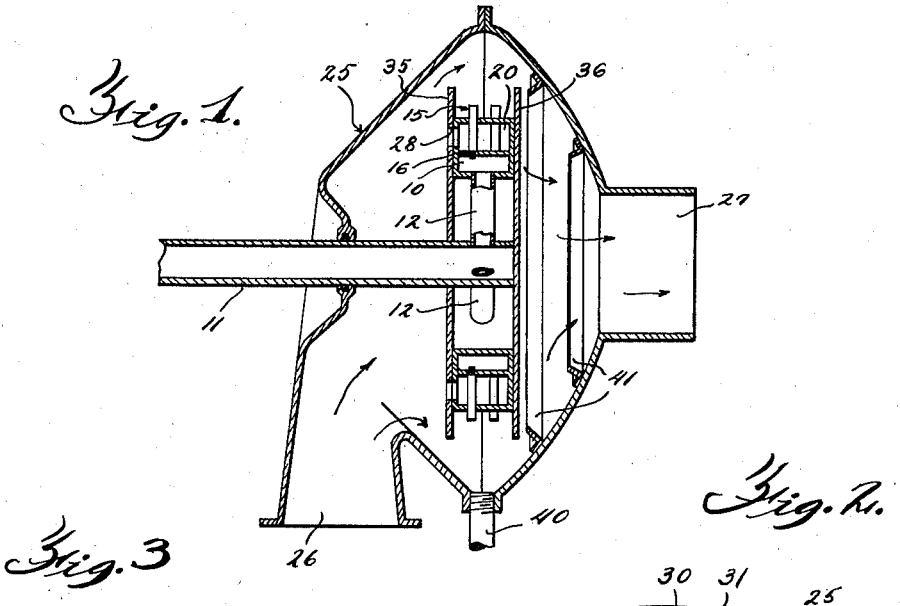

In order to avoid the danger of there being spaces between the jets of liquid discharged from the nozzles, through which spaces the gas might pass without contacting the jets, there are preferably provided shields 35 and 36 which are disposed on opposite sides of the two rows of nozzles as illustrated in Fig. 1. These disklike shields are of such diameter that they shield the space where the discharge jets are not completely intermingled the one with the other. It might be noted that the openings 28 may be conveniently formed in the disk 35 which is adjacent the inlet side of the casing so that a portion of the entering gases may flow into the chamber 20.

The casing 25 may conveniently be provided with a discharge conduit 40 by which the dust collecting liquid may be discharged after this liquid has removed the dust from the gases. Additionally, the casing may be provided adjacent the outlet 27 with baffles 41 which project inwardly from the inner wall of the casing and prevent the gas from carrying the liquid downward to the outlet 27.

In the operation of the construction as thus far described, the dust laden gas enters the casing by way of inlet 26. A portion of this gas enters the chamber 20 and from this chamber is drawn into the bores 17 of the nozzles 15, being compressed in these bores by the liquid under pressure supplied to the bores by way of chamber 10. The major portion of the gas entering the casing however, passes in a diverging outward direction past the periphery of shield 35 where it is bombarded by the liquid spray discharged from the nozzles 15. As previously mentioned, the expansive action of the gas upon leaving the nozzles 15 will properly break up the sprays of liquid discharged by these nozzles to form drops of the liquid. After passing through the area through which the liquid is sprayed, the gas alters its direction of travel and passes inwardly toward the axis of the casing and then out through the outlet 27.

In the embodiment of the invention which has just been described, the discharge nozzles and their associated chambers have been illustrated as being fixedly mounted in the casing 25. It will be apparent however, that if desired these nozzles and the chambers 10 and 20 may be mounted for rotation and such an arrangement is illustrated in Figs. 4 and 5 of the drawings.

Figure 4:
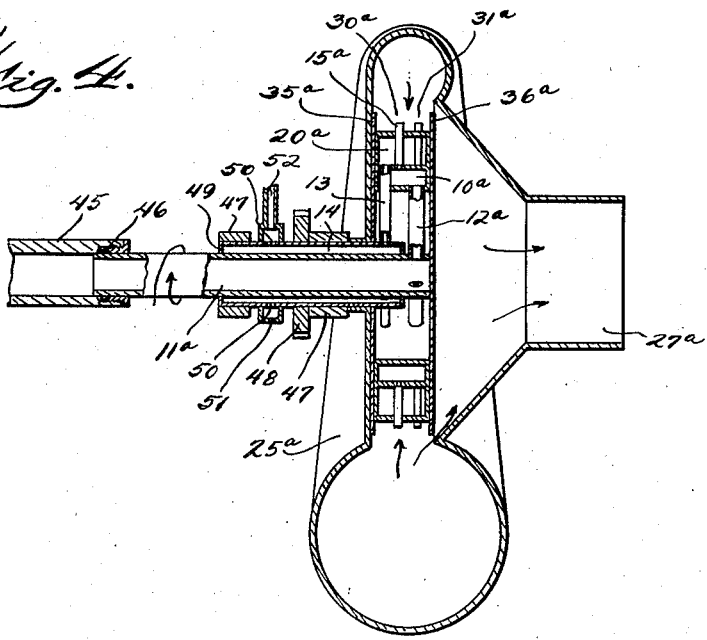
Fig. 4 is a view similar to Fig. 1 showing a slightly modified form of construction.
Figure 5:
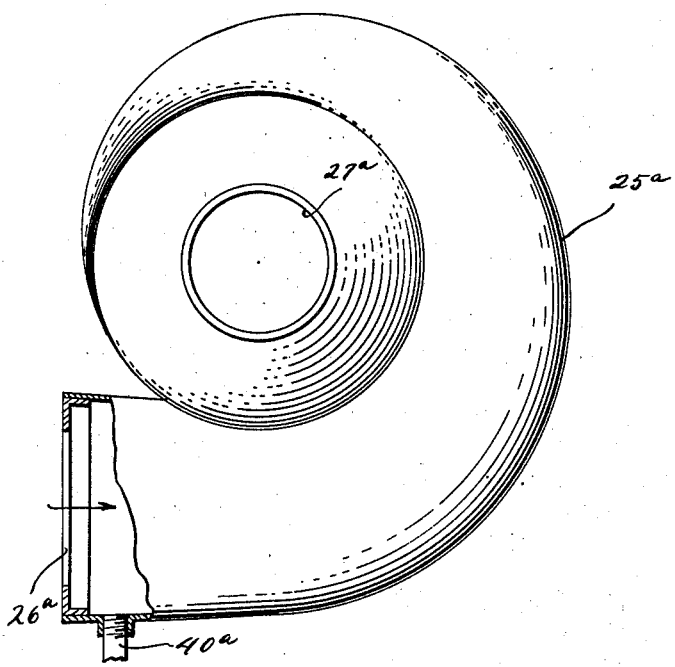
Fig. 5 is a side elevational view of the apparatus shown in Fig. 4.

Referring first to Fig. 4, the casing is designated generally by the reference character 25ᵃ. It is preferably of volute form and is provided with the inlet 26ᵃ and the outlet 27ᵃ. The shape of the casing is such that the gas entering the inlet 26ᵃ is propelled directly towards the discharge nozzles 15ᵃ with the result that the liquid impinges the gas at a velocity equal to the total of the velocities of the liquid and of the gas.

In this modified construction the supply pipe 11ᵃ connected by branch 12ᵃ to the liquid chamber 10ᵃ, extends exteriorly of the casing 25ᵃ and is journalled by means of a packed joint 46 in a suitable supply head. The chamber 20ᵃ is connected by conduits 13 to an annular chamber 14 which extends to a point exteriorly of the casing and is preferably integrally united with the supply pipe 11ᵃ as by the end walls 49. The chamber 14 is journalled exteriorly of the casing in suitable bearings 47 and is also preferably provided with a gear or pulley 48 by means of which this chamber and chamber 20ᵃ as well as the supply pipe 11ᵃ and chamber 10ᵃ may be rotated.

As in the previously described form of construction nozzles 15ᵃ are secured in the wall of chamber 10ᵃ, these nozzles passing through the chamber 20ᵃ and being preferably arranged in rows 30ᵃ and 31ᵃ. Likewise shields 35ᵃ and 36ᵃ are disposed on opposite sides of the rows of nozzles, these shields being secured to the walls of chamber 20ᵃ with the result that upon rotation of chamber 14 the nozzles, shields and chamber 10ᵃ will all be rotated.

If it is desired to supply atmospheric air to the chamber 20ᵃ it will be apparent that this may be accomplished by merely forming openings in the wall of chamber 14 at a point exteriorly of the casing. If, on the other hand, it is desired to supply a gas or air under pressure to this chamber, openings 50 may be formed in the wall of chamber 14, these openings communicating with an annular supply housing 51, which surrounds the chamber 14 exteriorly of the casing 25a. The chamber 51 may be supplied with any desired fluid under pressure by means of a supply conduit 52.

The arrows in Fig. 4 of the drawings indicate generally the direction of travel of the dust laden gases and it will be apparent by reference to this figure, that the gases travel in a direction substantially opposite to the direction of discharge of the jets from the nozzles 15a. Thus, as previously mentioned, the relative velocity between the liquid particles and the gas particles will be equal to the sum of the velocities of the liquid and gas so that by proportioning the gas and liquid velocities, impacts of the desired force may be obtained.

By reference to Fig. 5, it will be noted that the gas which enters the volute at 26a passes circumferentially around the casing 25a but in order for this gas to be discharged through the outlet 27a, it must flow radially inwardly toward the nozzles 15a. Thus the spray discharged from the nozzles 15a will impinge on the gas flowing through the casing with a force dependent upon the relative velocities of the gas flow and liquid discharge. The dust particles removed from the gas pass to the outer rim of the volute and will descend to the drain 40a as will be readily apparent.

From the above it will be apparent that the invention provides a construction in which a liquid and an elastic fluid may be introduced into a passage or nozzle to produce the desired velocity of discharge by combining the pressure of the liquid and the expansive force of the elastic fluid. The liquid may be supplied under any desired pressure, while the gas may be air at atmospheric pressure, the gas which is being treated or any other desired fluid supplied under pressure or otherwise to the chamber 20. The construction shown in Fig. 4 may obviously be incorporated in the casing shown in Fig. 1, while conversely the stationary structure shown in Fig. 1 might be incorporated in the casing shown in Fig. 4.

Additionally, since it is not necessary that the series of nozzles be rotated, the nozzles might be associated with the gas duct in any desired manner insofar as the gas to be treated is caused to flow through the area covered by the jets of liquid discharged by the nozzles. The liquid will be caused to impinge on the gas being treated at such a velocity that the liquid drops will destroy the gaseous surface tension of the dry solids in the gas, thus effecting an efficient removal of the dust particles from the gas.

While the invention has been described with some detail, it will be understood that the description is for the purposes of illustration only and is not definitive of the limits of the inventive idea. The right is reserved to make such changes in the details of construction and arrangement of parts as will fall within the purview of the attached claims.

What we claim as our invention is:

1. In a fluid treating apparatus a volute casing, means providing a substantially annular passage for the fluid to be treated, a nozzle having a passage through which liquid is discharged into said fluid passage, means for supplying a liquid under pressure to said nozzle passage for discharge from the same into contact with the fluid flowing through said fluid passage, said nozzle having angularly disposed passages opening through the sides of the nozzle for supplying an elastic fluid to the nozzle passage for discharge therefrom with the liquid.

2. In a fluid treating apparatus a volute casing, means providing a substantially annular passage for the fluid being treated, a nozzle having a passage through which liquid is discharged into said fluid passage, means for supplying a liquid under pressure to said nozzle passage for discharge from the same into contact with the fluid flowing through said fluid passage, said nozzle having angularly disposed passages opening through the sides of the nozzle for supplying a gas under pressure to the nozzle passage for discharge therefrom with the liquid.

3. In a fluid treating apparatus, means providing a passage for the fluid to be treated, means providing an annular liquid chamber within said passage, means for supplying a liquid under pressure to said chamber, a plurality of discharge nozzles communicating with said chamber and projecting therefrom, means for supplying an elastic fluid to each of said nozzles for discharge therefrom with the liquid and means for rotating said chamber and the nozzles associated therewith.

4. In a fluid treating apparatus, means providing a passage for the fluid to be treated, means providing a substantially annular liquid chamber in said passage, means for supplying a liquid under pressure to said chamber, a plurality of nozzles communicating with said liquid chamber and projecting therefrom for discharging liquid from said chamber into contact with the fluid flowing through said passage, said nozzles being arranged in a row circumferentially of said chamber, means for supplying an elastic fluid to each of said nozzles for discharge therefrom with the liquid and means for rotating said chamber and the nozzles associated therewith.

5. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in a plurality of rows circumferentially of said chamber with the nozzles of one row staggered relative to the nozzles of an adjacent row, and means for supplying an elastic fluid to each of said nozzles.

6. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in a plurality of rows circumferentially of said chamber with the nozzles of one row staggered relative to the nozzles of an adjacent row, means for supplying an elastic fluid to each of said nozzles, and means for preventing the fluid flowing through said passage from flowing adjacent the discharge ends of said nozzles.

7. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in two rows circumferentially of said chamber with the nozzles of one row staggered relative to the nozzles of the other row, means for supplying an elastic fluid to each of said nozzles, and means including a disk of greater diameter than the radial extent of the nozzles from the liquid chamber arranged to prevent the fluid flowing through said passage from flowing adjacent the discharge ends of said nozzles.

8. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in two rows circumferentially of said chamber with the nozzles of one row staggered relative to the nozzles of the other row, an annular fluid chamber surrounding said liquid chamber, said nozzle having passages communicating with said annular fluid chamber, and means for supplying an elastic fluid to said annular chamber.

9. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in two rows circumferentially of said chamber with the nozzles of one row staggered relative to the nozzles of the other row, a second annular chamber surrounding said liquid chamber, said nozzles having passages communicating with said second annular chamber, and means for supplying a gas under pressure to said second annular chamber.

10. In a fluid treating apparatus, means providing a passage for the fluid to be treated, means providing a substantially annular liquid chamber within said passage, means for supplying a liquid under pressure to said chamber, a plurality of nozzles communicating with said chamber and arranged to discharge the liquid from the chamber into contact with the fluid flowing through said passage, said nozzles being arranged in two rows circumferentially of said chamber with the nozzles of one row staggered relative to the nozzles of the other row, an annular fluid chamber surrounding said liquid chamber, said nozzles having passages communicating with said fluid chamber, means for supplying an elastic fluid to said fluid chamber, and means for rotating said chambers and the nozzles carried thereby.

CURTIS L. HOWSE.
HARRY E. BRELSFORD.